United States Patent
Watanabe

[11] Patent Number: 5,128,656
[45] Date of Patent: Jul. 7, 1992

[54] LEVEL DETECTING METHOD AND ITS APPARATUS

[75] Inventor: Kajiro Watanabe, Koganei, Japan

[73] Assignee: Kansai Automation Co., Ltd., Osaka, Japan

[21] Appl. No.: 573,916

[22] Filed: Aug. 28, 1990

[30] Foreign Application Priority Data

Jun. 18, 1990 [JP] Japan .................... 2-159340

[51] Int. Cl.$^5$ .................................... G01F 23/28
[52] U.S. Cl. .................... 340/621; 367/908; 181/402; 73/290 V
[58] Field of Search ......... 73/290 V; 340/612, 616, 340/617, 618, 621; 367/908; 181/402

[56] References Cited

U.S. PATENT DOCUMENTS

| | | | |
|---|---|---|---|
| 3,229,523 | 1/1966 | Boyd et al. | 73/290 V |
| 3,572,119 | 3/1971 | Bak | 73/290 R |
| 4,170,135 | 10/1979 | Booman et al. | 73/290 R |
| 4,325,255 | 4/1982 | Howard et al. | 73/290 V |
| 4,458,530 | 7/1984 | Bastida | 73/290 R |
| 4,790,183 | 12/1988 | Pfost et al. | 73/290 V |
| 4,807,471 | 2/1989 | Cournane et al. | 73/290 R |

Primary Examiner—William A. Cuchlinski, Jr.
Assistant Examiner—Diego F. F. Gutierrez
Attorney, Agent, or Firm—Koda and Androlia

[57] ABSTRACT

A level detecting method and apparatus wherein a tubular member with one end open has a stationary wave generating means located within the tubular member. The stationary wave generating means generates stationary waves having a node or antinode at the open end, whereby a switching signal is provided when the open end of the tubular member is completely closed by a measuring object or when the measuring object approaches the open end. The apparatus comprises an oscillator, a tubular member with only one end open, stationary wave generating means for generating stationary waves of a specific frequency so as to have a node or antinode at the open end of the tubular member by receiving an oscillation output from the oscillator, the means being installed within the tubular member to divide it into an opening side and a closing side, and a switching circuit for providing a switching signal when the open end of the tubular member is completely closed by the measuring object or when the measuring object approaches the open end.

13 Claims, 14 Drawing Sheets

LEVEL DETECTING METHOD AND ITS APPARATUS

BACKGROUND OF THE INVENTION

1. Field of the Invention

The present invention relates to a level detecting method for detecting if content (object to be measured) in a tank or the like has reached a specified level or not without making contact therewith, and its apparatus.

2. Prior Art

Conventionally, as this type of level detecting method and its appartus, contact type apparatuses have been employed, in which, for example, a rod element vibrating vertically at a specific frequency is disposed projecting from the wall into the inside of a tank containing content such as powder, granules, or lumps, and when the materials contacts with the rod element to restrict the vibration of the rod element, the vibration of the rod element is stopped by the content, so that it is detected that the content has reached to a specified level.

The apparatus of this type, however, has its own problems, that is, since the vibration of the rod element is designed to be restricted and stopped by being pressed by the content having its own weight, in the case of very light object such as feather and cotton, even if the object to be measured reaches a specified level, it is not detected at all.

SUMMARY OF THE INVENTION

It is hence a primary object of the invention to present a level detecting method capable of detecting reliably even the level of very light materials such as feather and cotton, and also to provide such an apparatus.

To solve the above-mentioned problem, the invention firstly presents a level detecting method wherein a tubular member with one end open has a stationary wave generating means at the other end thereof, and the stationary wave generating means generates acoustic stationary waves or acoustic standing waves (hereinafter called "stationary waves") having a node or antinode at the open end, whereby a switching signal is provided when the open end is completely closed by measuring object or, when the measuring object approaches the open end to thereby indicate that the desired level has been reached.

The invention secondly presents a level detecting apparatus comprising an oscillator, a tubular member with both ends open, acoustic stationary wave generating means or acoustic standing wave generating means (hereinafter called "stationary wave generating means") for generating stationary waves of a specific frequency so as to have a node or antinode at one open end of the tubular member by receiving an oscillation output from the oscillator, the means being attached to the other open end of the tubular member, and a switching circuit for providing a switching signal when said one open end of the tubular member is completely closed by the measuring object or the measuring object approaches said one open end.

According to the first constitution of the invention, stationary waves are generated in the tubular member by the stationary wave generating means, such as loudspeaker, piezoelectric vibrator, quartz vibrator, magnetostriction oscillator, and set in a resonance state. And when the open end of the tubular member is closed by the measuring object, the stationary waves in the tubular member become in a nonresonance state and a high load is applied to the stationary wave generating means, thereby the high impedance of a driving coil or the like is detected and a switching signal is provided.

According to the second constitution, one of the open ends of the tubular member is set open, and the other end is closed by installing stationary a wave generating means, such as loudspeaker, piezoelectric vibrator, quartz vibrator, magnetostriction oscillator, the stationary wave generating means being driven at specific frequency to generate stationary waves in the tubular member. The stationary waves in the tubular member are set in a nonresonance state when the opened end is closed by the measuring object, and when a detecting part for detecting a high impedance of a driving coil or the like detects the high impedance, a switching signal is provided.

Therefore, it is possible to detect reliably even the level of very light materials such as feather and cotton.

In addition, the structure is very simple as compared with conventional ones, which brings about high productivity.

DETAILED DESCRIPTION OF THE INVENTION

First Embodiment

Figure 1:
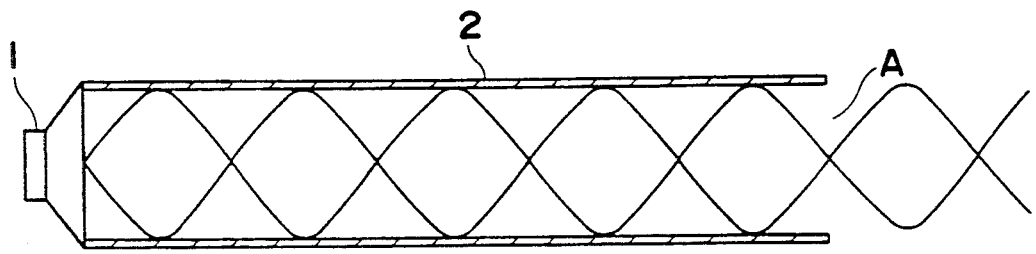
FIG. 1 is an explanatory drawing of a first embodiment for explaning the principle of the present invention.
Figure 2:
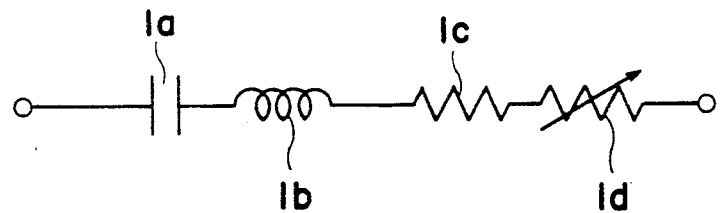
FIG. 2 is an electrical equivalent circuit of a loudspeaker in FIG. 1.
Figure 3:
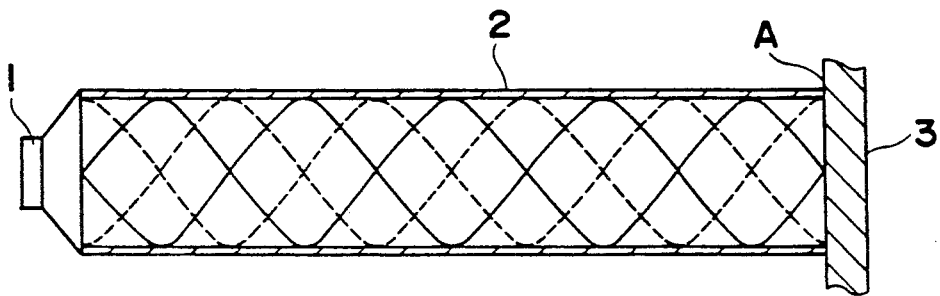
FIG. 3 is an explanatory drawing for explaining the function of the first embodiment.

Referring now to FIGS. 1 to 3, the basic principle of the invention is described below.

Numeral 1 is a loudspeaker, which is an acoustic stationary or acoustic standing wave generating means (hereinafter merely called "stationary wave generating means,") possessing a resonance point (resonance frequency) in acoustic characteristic and it is driven in sine wave by a driving circuit 4 described below of which driving frequency is set so as to match with the resonance frequency of the loudspeaker 1. An electric equivalent circuit of the loudspeaker 1 is expressed as a series circuit of capacitor $1a$, coil $1b$, resistance $1c$, and variable acoustic impedance $1d$ as shown in FIG. 2. Numeral 2 denotes a tube (tubular member) with the both ends open and formed in a cylindrical shape; one open end is closed by the loudspeaker 1, while the other open end A is left open. The length of the tube 2 is set at an odd-number multiple of ¼ wavelength of sinusoidal driving signal of the loudspeaker 1, in which acoustic stationary waves or acoustic standing waves (hereinafter merely called "stationary waves") are to be generated so that a node may be formed in the other open end A of the tube 2.

In such constitution, while the other open end A of the tube 2 is left open, a sound wave emitted from the loudspeaker 1 becomes an acoustic stationary wave or acoustic standing wave (hereinafter merely called "stationary wave", which is shown by the solid-line waveform in FIG. 1) in the tube 2 and becomes in a resonance state.

Figure 4:
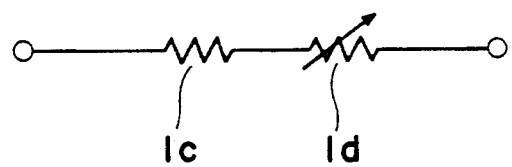
FIG. 4 is an electrical equivalent circuit of the loudspeaker in a resonance state.

However, when the other open end A of the tube 2 is completely closed by an object 3 as shown in FIG. 3, the sound wave (the solid-line waveform in FIG. 3) emitted from the loudspeaker 1 hits against the object 3 in its node part, thereby changing over to in a nonresonance state (indicated by broken-line waveform deviated in phase by 90 degrees from the solid-line waveform in FIG. 3). That is, the sound wave has an antinode at the other open end A, and the variable acoustic impedance $1d$ of the loudspeaker 1 is changed to high impedance. Meanwhile, since the loudspeaker 1 is driven at the same driving frequency as the intrinsic resonant frequency of the loudspeaker 1 (the resonant frequency of the resonance circuit composed of capacitor $1a$ and coil $1b$), the electrical equivalent circuit of the loudspeaker 1 becomes a series circuit of the resistance $1c$ and variable acoustic impedance $1d$ as shown in FIG. 4. Therefore, by detecting the difference between the synthetic impedance (the impedance in a series circuit of capacitor $1a$, coil $1b$, resistance $1c$, and variable acoustic impedance $1d$) when the other open end A of the tube 2 is left open, and the synthetic impedance when closed (the impedance in a series circuit of resistance $1c$ and variable acoustic impedance $1d$), it is possible to detect whether the object 3 has closed the other open end A completely or not.

In the foregoing embodiment, meanwhile, the stationary waves are set to have a node at the other open end A, but they may be also set to have an antinode there, and in this case a nonresonant state is established when the other open end A is left open, and when it is closed by the objects 3, a resonant state is created.

Incidentally, it is considered ideal that the acoustic characteristic of the loudspeaker 1 to the frequency may be set flat, that is, a loudspeaker free from a resonance point. However, in the present invention, such a resonance point is positively utilized, a weight may be formed with resin or the like on the cone paper (or its equivalent) of the loudspeaker so as to generate a desired resonance point.

Figure 5:
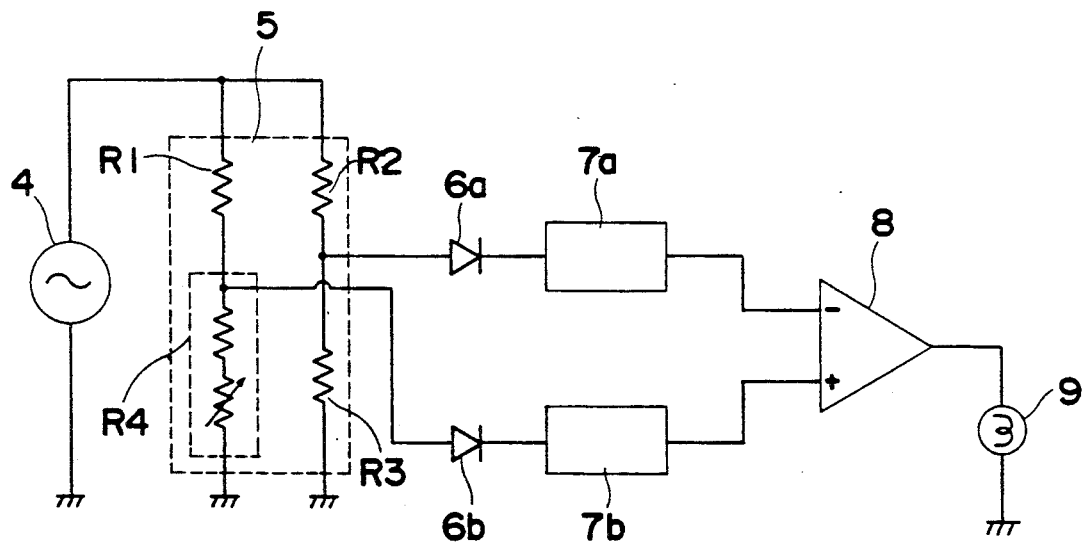
FIG. 5 is a system circuit explanatory drawing including the circuitry of driving the loudspeaker in FIG. 1.

Next is explained a method of detecting the change of the synthetic impedance in the circuit shown in FIG. 5.

Specifically, numeral 4 is an oscillation circuit (driving circuit) of which oscillation frequency is set at the same frequency as that of the resonance point of the loudspeaker 1, and numeral 5 is a bridge circuit composed of a synthetic impedance R4 of resistances R1, R2, R3 and loudspeaker 1 (since usually in a resonance state, it is hence the sum of resistance $1c$ and variable acoustic impedance $1d$ shown in FIG. 4), the bridge circuit being supplied with an oscillation output in sine wave from the oscillation circuit 4. In an open state while the other open end A of the tube 2 is not closed by the object 3, the equation $R1 \times R2 = R3 \times R4$ is established, and the voltage at the junction of resistance R1 and synthetic impedance R4 and the voltage at the junction of the resistances R2 and R3 are equal and provided. Numerals $6a$, $6b$ are a first and a second half-wave rectifying circuit, and two voltages provided from the bridge circuit 5 are supplied, and are respectively half wave rectified and provided. Numeral $7a$, $7b$ are a first and a second integrating circuit for integrating the rectified outputs supplied from the first and the second half-wave rectifying circuit $6a$, $6b$ by a specific time constant. Numeral 8 denotes a comparing circuit which compares the integral outputs supplied respectively from the first and the second component circuit $7a$, $7b$. and provides a high level signal when the output of the second integrating circuit $7b$ is greater. Numeral 9 is an alarm lamp which lights up to tell that the other open end A of the tube 2 is closed by the object 3 when the output of the comparing circuit 8 becomes high level.

When thus composed and the loudspeaker 1 is driven at the same frequency as that of its resonance point, in the state shown in FIG. 1, the other open end A of the tube 2 is set open and a resonance state is established, and therefore the bridge circuit 5 is balanced, and the integral outputs from the first and the second integrating circuit $7a$, $7b$ are equal. Accordingly, the output of the comparing circuit 8 remains low level and the alarm lamp 9 does not light up.

When the other open end A of the tube 2 in a resonance state is closed by the object 3, the variable acoustic impedance R4 of the loudspeaker 1 is changed to the larger side by changing the stationary waves to in a semiresonance state (the sine wave indicated by the dotted line in FIG. 3), and the bridge circuit 5 becomes in a state of $R1 \times R3 \neq R2 \times R4$ so as to be set in an imbalanced state. As a result, the integral outputs from the first and the second integrating circuits $7a$, $7b$ are mutually different in magnitude, and the alarm lamp 9 lights up by a high level output signal from the comparing circuit 8, thereby indicating that the other open end A is closed.

Figure 6:
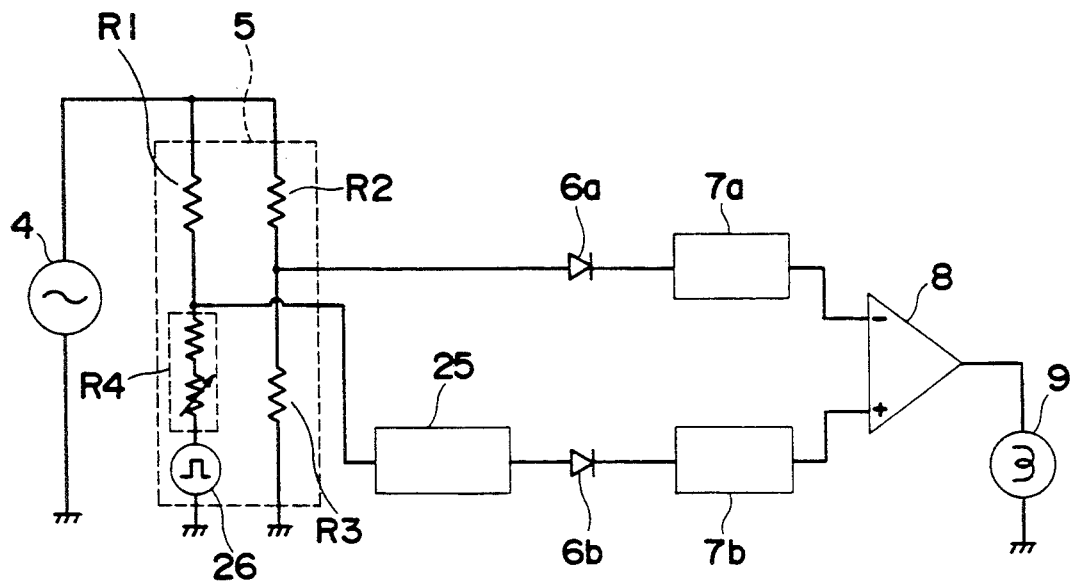
FIG. 6 is an explanatory circuit diagram for explaining FIG. 5.
Figure 7:
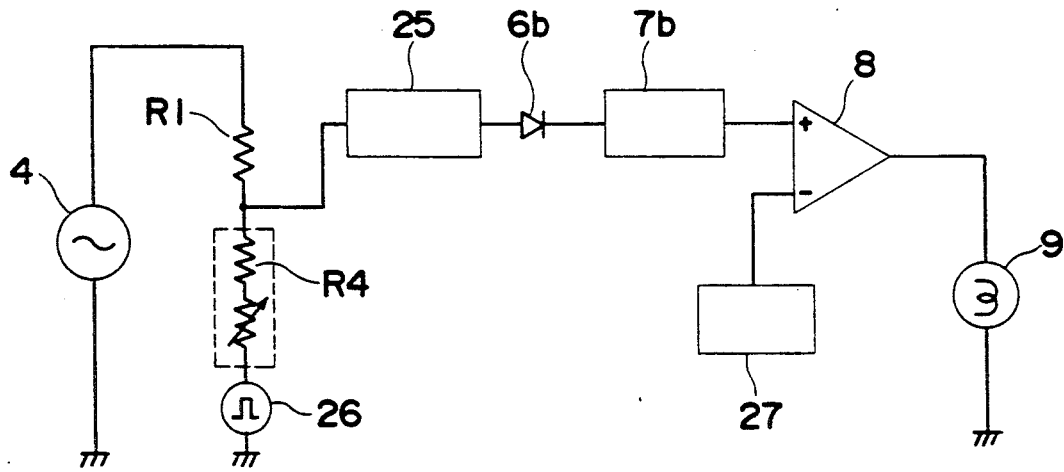
FIG. 7 is an improved circuit diagram of the circuit in FIG. 5.

Meanwhile, as the loudspeaker 1 has a sound receiving function as a microphone besides a sound generating function, if there is made a large noise in a tank storing measuring materials or a hitting sound by an object hitting against the outer wall of the tank, a noise of a frequency component different from the driving frequency of the loudspeaker 1 could be generated as a counterelectromotive force in a driving terminal of the loudspeaker 1 (in an equivalent circuit, indicated as pulse generation source 26; see FIGS. 6, 7), the noise being impulsive and having a large wave crest value in a short time. The generation of the counterelectromotive force sometimes causes wrong operation of the apparatus. Therefore, in the case of generation of the above-mentioned hitting sound or the like being anticipated, in order to eliminate such a noise, as shown in FIG. 6, a band pass filter 25 extracting only the driving frequency of the loudspeaker 1, or a frequency component same the as the output signal of the oscillation circuit 4 may be inserted between an input terminal of the second rectifying circuit 6b and a nongrounding side terminal of the resistance R4. In FIG. 6, meanwhile, a pulse generation circuit 26 is shown for convenience sake, but it is not an actual circuit constituent element.

Furthermore, in the circuit shown in FIG. 5, the resistance R2, R3 of the bridge circuit 5, the first rectifying circuit 6a and the first intergrating circuit 7a generate a reference voltage becoming a threshold for driving the alarm lamp 9, and by replacing them with the reference voltage generating circuit 27 in FIG. 7, the circuit may be simplified.

In FIGS. 6 and 7, those shown with the same reference numbers as in FIG. 5 are equivalents thereof.

In this embodiment, although the loudspeaker 1 is provided at one end of the two open ends of the tubular member 2, the structure of the present invention is naturally not limited to this and the loudspeaker 1 may be provided inside the tubular member 2.

Second Embodiment

Figure 8:
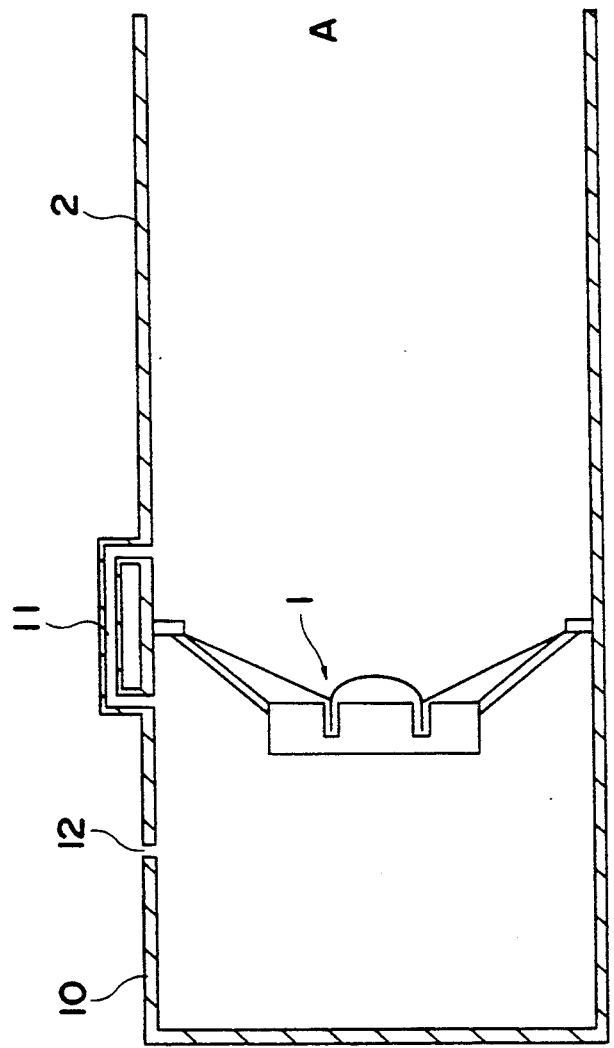
FIG. 8 is a sectional explanatory drawing of a sensor unit in a second embodiment of the present invention.

The constitution is explained by referring to FIG. 8. In FIG. 8, the same or equivalent parts as in FIG. 1 are identified with the same reference numbers and are not explained herein.

Numeral 10 is a cylindrical protective tube for covering the loudspeaker 1 so as to be sealed from behind, and its length is set to an integer multiple of the half wavelength of the driving frequency of the loudspeaker 1, so that the resonance state may be always formed. The protective tube 10 is disposed so that the air may communicate with the tube 2 through a fine tube 11, in other words, it is connected so that the pressure fluctuation may be transmitted to behind the loudspeaker 1, if the pressure in the tube 2 (varying along with the pressure in the tank in which the apparatus is installed) varies slowly, so that the cone paper (or its equivalent) of the loudspeaker may not be broken by being thrust forward or backward by pressure. If the air in the tube 2 is high in temperature and when the air is desired to be released outside, small pores 12 may be pierced in the circumferential wall of the protective tube 10. The positions of such pierced small pores 12 are naturally at a node of the stationary wave formed by driving of the loudspeaker 1 in the protective tube 10 (the frequency and the driving frequency of the loudspeaker are the same).

Third Embodiment

Figure 9:
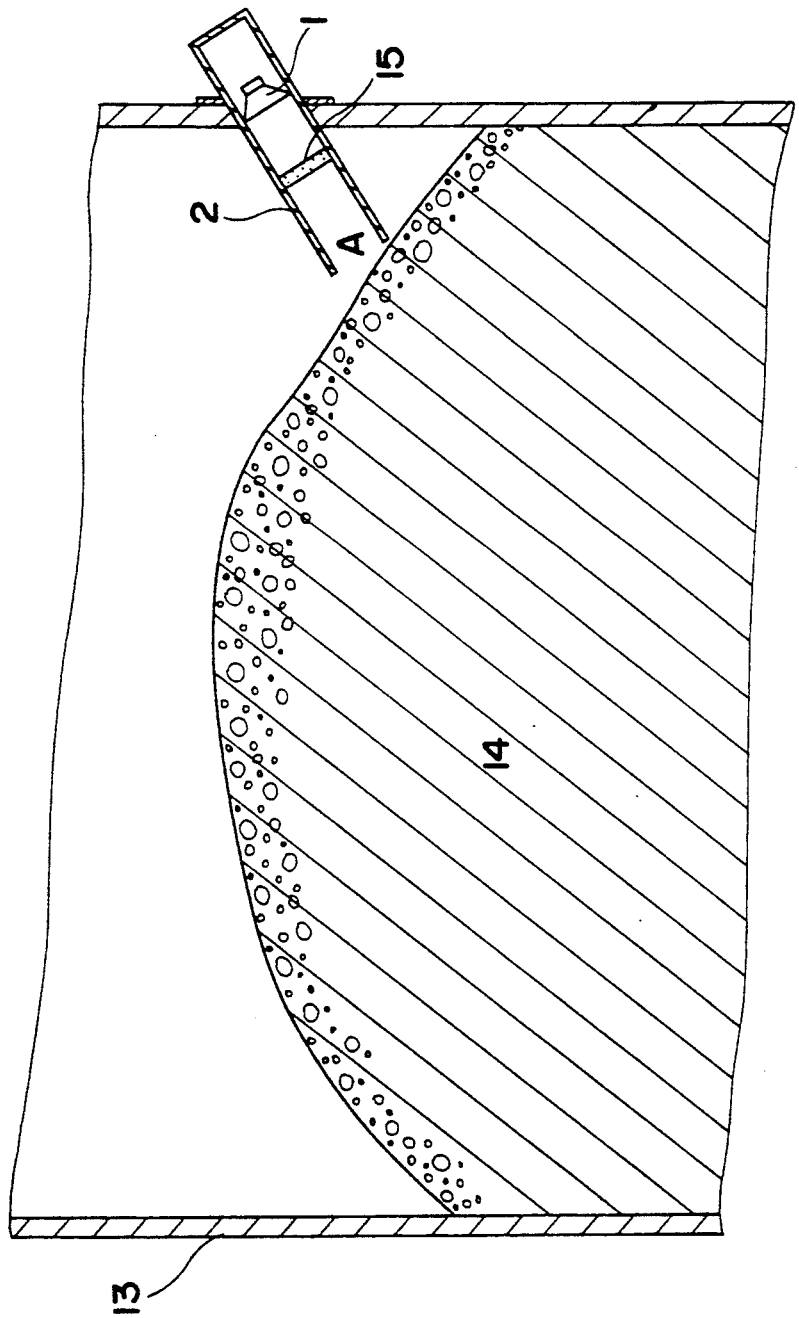
FIG. 9 is an explanatory drawing of mounting a sensor unit on a tank in a third embodiment of the present invention.
Figure 10:
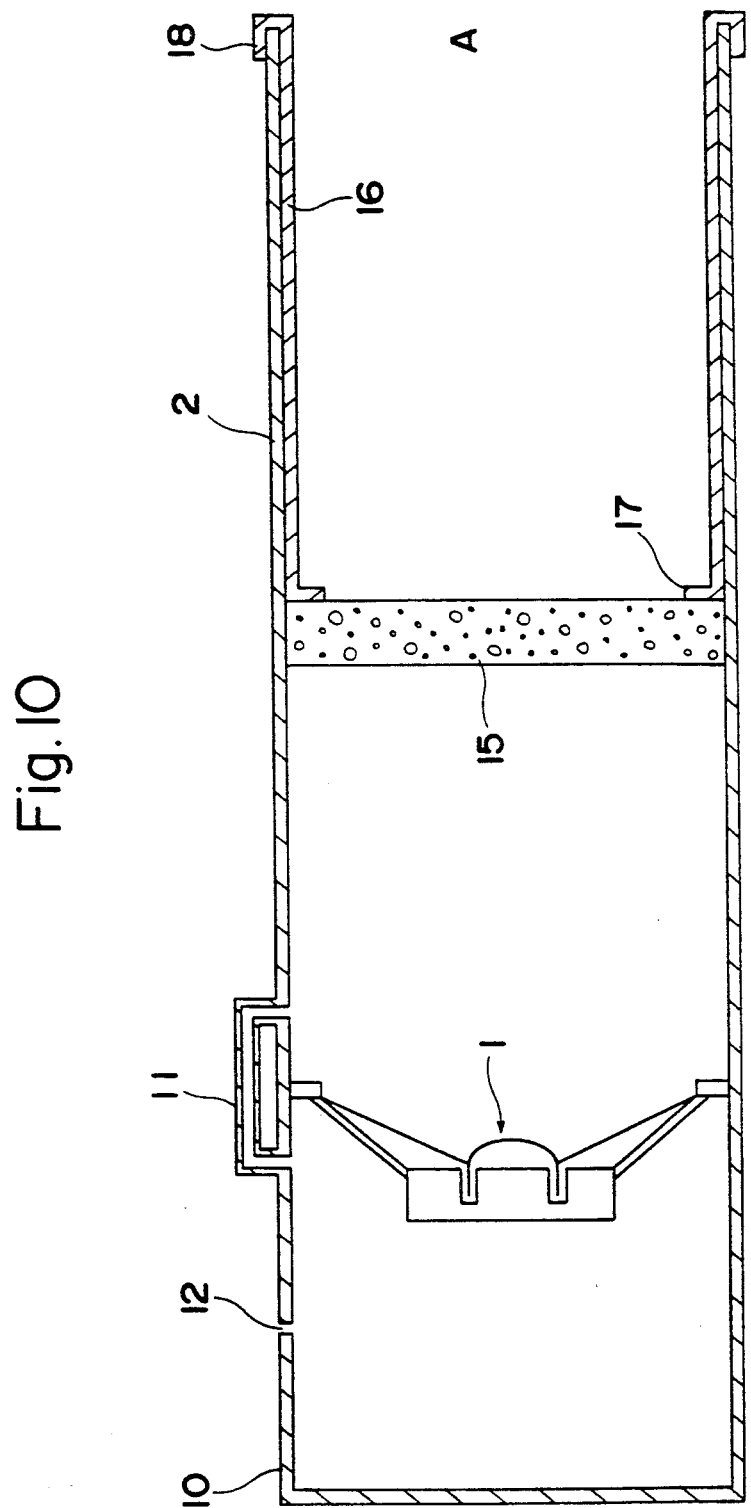
FIG. 10 is a sectional explanatory drawing for explaining an improved example of FIG. 8 and also an enlarged explanatory drawing of essential parts in FIG. 9.
Figure 11:
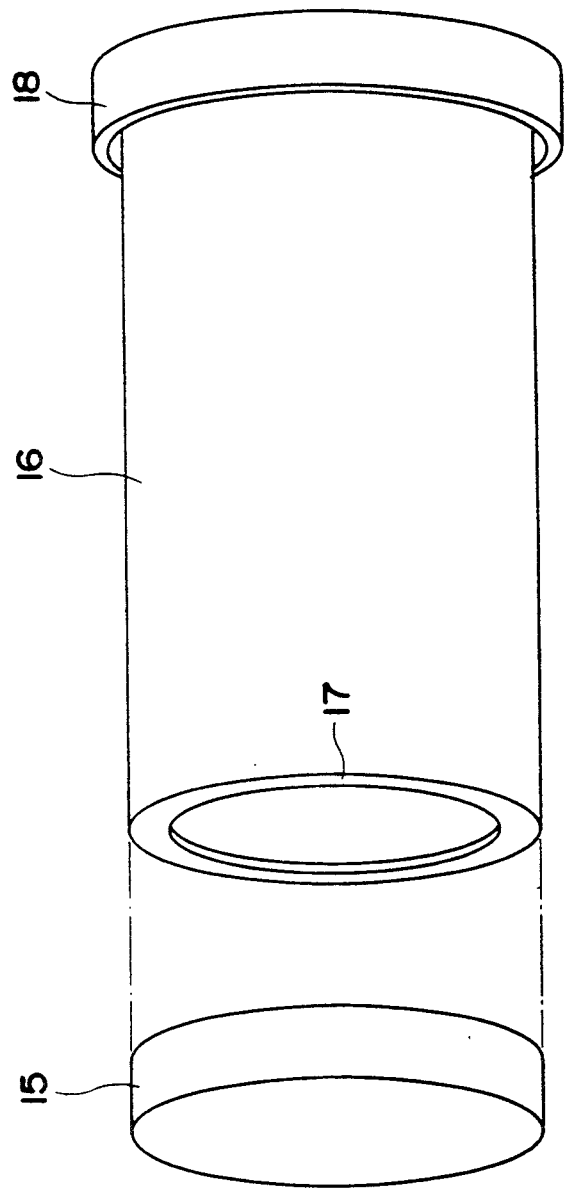
FIG. 11 is an enlarged explanatory drawing of essential parts in FIG. 10.

The construction is explained by referring to FIGS. 9 to 11. In FIGS. 9 to 11, the same or equivalent parts as in FIG. 8 are identified with the same reference numbers and are not explained herein.

In FIG. 9 is shown that the level detecting apparatus shown in FIG. 8 is set downward, or the open end A of the tube 2 is set downward, and is set and fixed on the side wall of a tank 13 so that, even if granular or powder measuring object 14 is getting into the tube 2, it is prevented from staying in the tube 2 and is soon to roll and fall down. This constitution provides the function of measurement and detection as a level detecting apparatus.

A detailed structure of the level detecting apparatus attached to the tank 13 is described by referring to FIGS. 10 and 11. Numeral 15 is a sponge, and it is disposed at the portion of a node of the stationary wave in the tube 2 by the sound wave generated by the loudspeaker 1, the portion being of the smallest vibration or movement of the air molecular for propagation of sound wave. Numeral 16 is a tube with both ends open, of which outside diameter coincides with the inside diameter of the tube 2. At one of its open ends projects a ring-shaped flange 17 inward and the sponge 15 is adhered and fixed to the flange 17. And at the other open end is formed an engaging part 18 with a U-shaped section to fit onto a circumferential edge of the other open end A of the tube 2.

In thus composed tube 16, as the engaging part 18 is pushed until it is stuck with the circumferential edge of the other open end A of the other tube 2, the sponge 15 is disposed at the position of a node of the stationary wave. Then the sponge prevents dust getting into the tube 2 from the other open end A from depositing on the loudspeaker 1, and moreover it does not impede the passing of the sound so that the detecting precision may be secured for a long period. When the sponge 15 get dirty, it may be replaced with a new one by drawing it out the tube 16, and therefore maintenance is easy.

Fourth Embodiment

Figure 12:
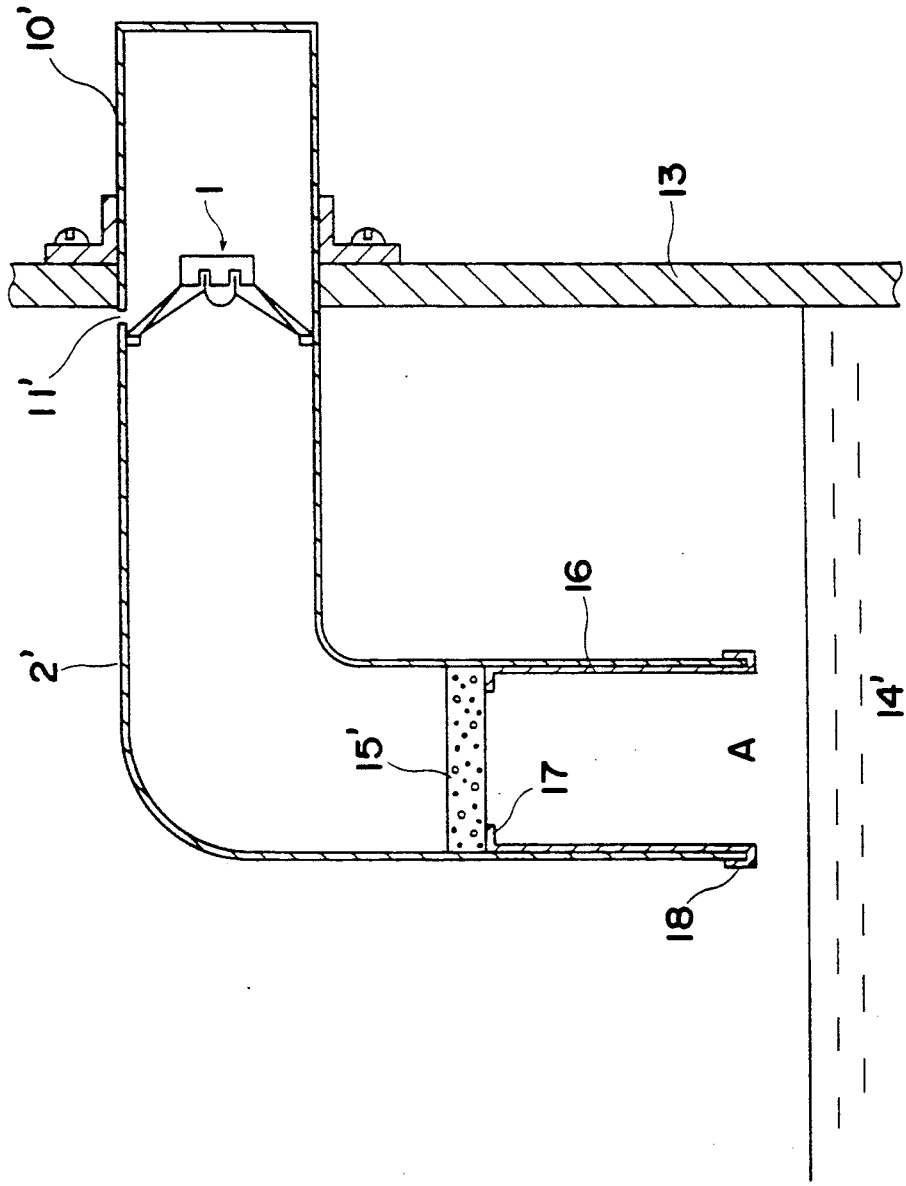
FIG. 12 is a sectional explanatory drawing for explaining a case of level detection of a solution in a plant or the like in a fourth embodiment.

The constitution is explained by referring to FIG. 12. FIG. 12 shows a structure in which the tube 2 in FIG. 10 is attached to the tank 13 with its front end part bent downward by 90 degrees. Numeral 2' is a tube, which is bent downward by 90 degrees at its middle part. A tube 16 is stuck with the front end part of the tube 2' and a chemical-resistant sponge 15' is adhered to a flange 17 of the tube 16 (same as in FIG. 11). The disposing position of the sponge 15' is, needless to say, at a node of the stationary wave formed in the tube 2'. The sponge 15' is acidic or alkaline so as to neutralize the vapor of measuring liquid 14', the level of which being detected, invading from the front end part of the tube 2'. In such constitution, the level of the liquid 14' may be monitored without contacting with strong acidic or strong alkaline liquid 14', and a contactless level switch of very simple maintenance may be obtained. Numeral 11' is a small pore pierced in the protective tube 10', which is designed to match the internal pressure of the tank 13 with that of the protective tube 10', thereby preventing breakage of the cone paper or its equivalent of the loudspeaker 1.

Fifth Embodiment

Figure 13:
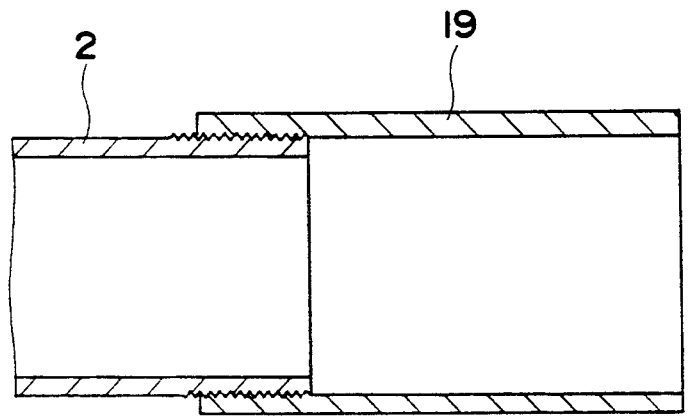
FIG. 13 is a sectional explanatory drawing of essential parts enabling to adjust the length of a tubular element in FIG. 8 in a fifth embodiment.
Figure 16:
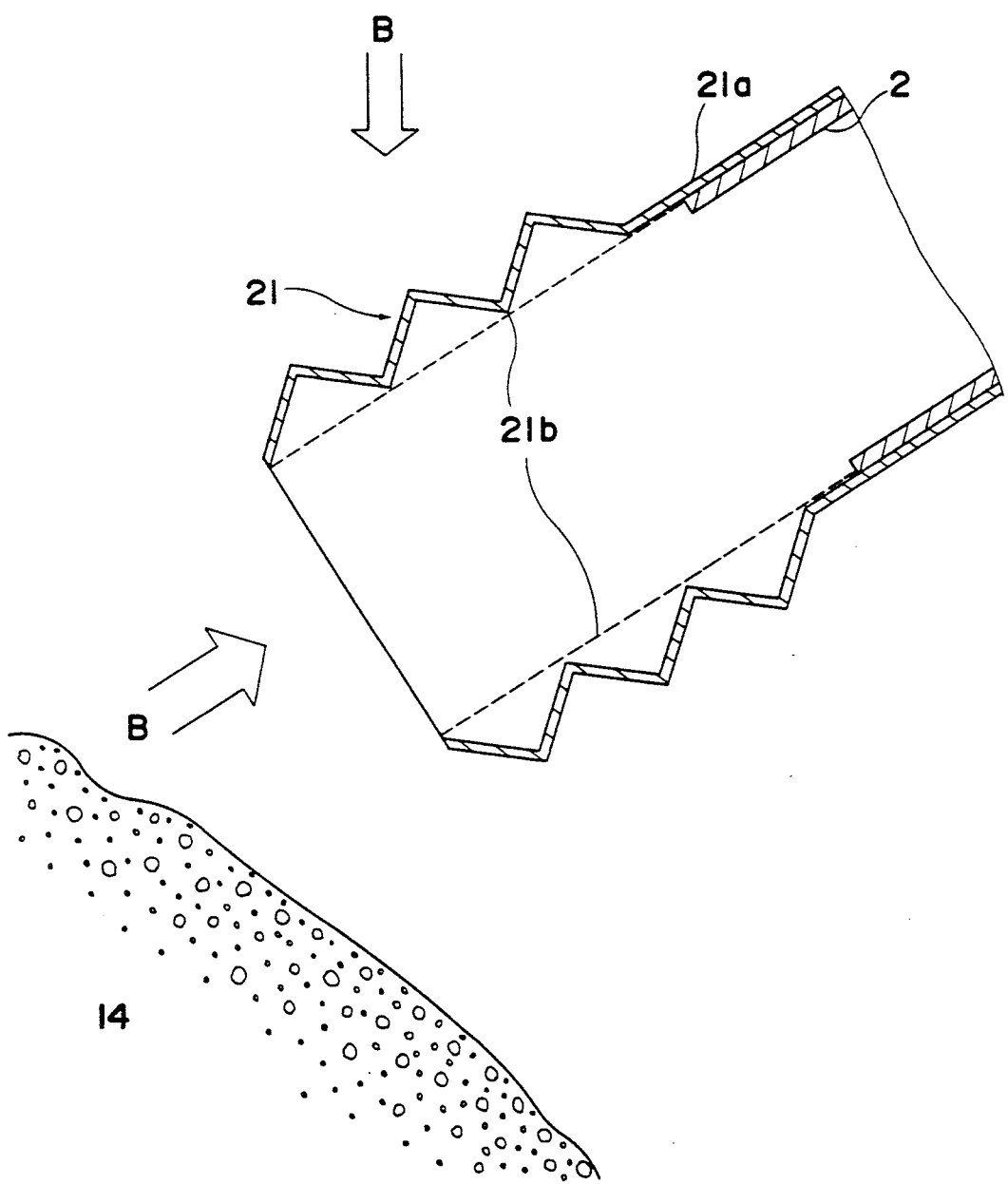
FIG. 16 is an explanatory drawing in which the sensor unit having the structure shown in FIG. 15 is mounted on a tank.

The constitution is explained by referring to FIG. 13. FIG. 13 shows the structure of the front end part of the tube 2 in FIG. 16, in which another cylindrical tube 19 is screwed into the front end of the tube 2, and by rotating the cylindrical tube 19, the length of the entire tube may be adjusted so that a node or antinode of the stationary wave may be positioned at the open end of the tube, and therefore the sensitivity adjustment at the time of shipment is facilitated.

Sixth Embodiment

Figure 14:
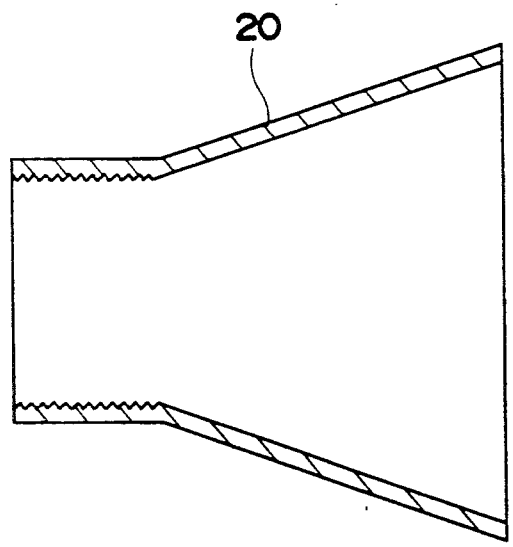
FIG. 14 is a sectional explanatory drawing of essential parts enabling to adjust the length of a tubular element in FIG. 8 in a sixth embodiment.

The constitution is explained by referring to FIG. 14. In FIG. 14, the shape of the cylindrical tube 19 in FIG. 13 is changed to a trumpet-shaped tube 20 increasing and opening toward the front end. Thus, by gradually increasing the inside diameter of the tube 20 toward the front open end, even measuring object 14 of large particles or lumps may easily get into the tube 20, and the open end is securely closed, so the measuring object 14 may be easily detected.

Seventh Embodiment

Figure 15:
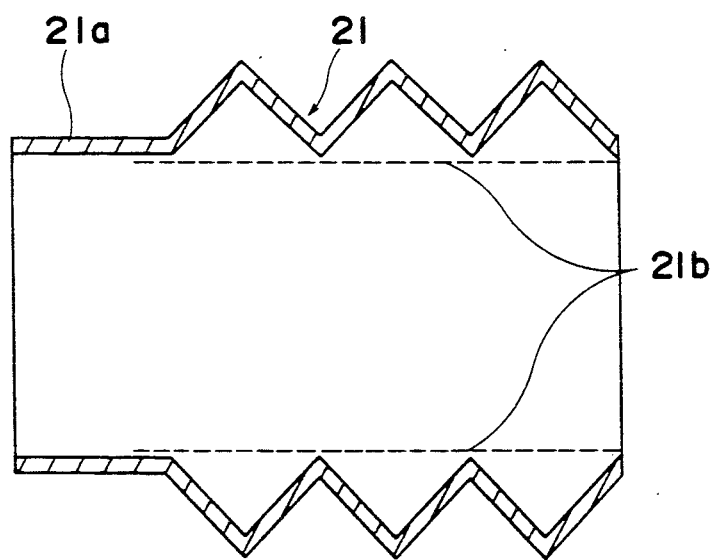
FIG. 15 is a sectional explanatory drawing in which an open end portion of the tubular element in FIG. 8 is made flexible in a seventh embodiment.

The constitution is explained by referring to FIG. 15. FIG. 15 is to show a tube 21 in which the shape of the front end part of the cylindrical tube 19 in FIG. 13 is modified into flexible bellows. In a base part 21a of the tube 21 is formed a fixing part to be stuck and fitted to the front end part of the tube 2 and a cylindrical wire netting 21b knitted in mesh form is disposed inside the bellows part. Accordingly, if the measuring object 14 is heavy object such as metal scrap and is dropped or jumps to hit the tube 21 in the directions indicated by B in FIG. 16, the tube 21 is flexibly deformed and is then restored to the original form, that is, it is designed not to be broken. The wire netting 21b is set to have a mesh such that the object may not get into the recess of the bellows.

Eighth Embodiment

Figure 17:
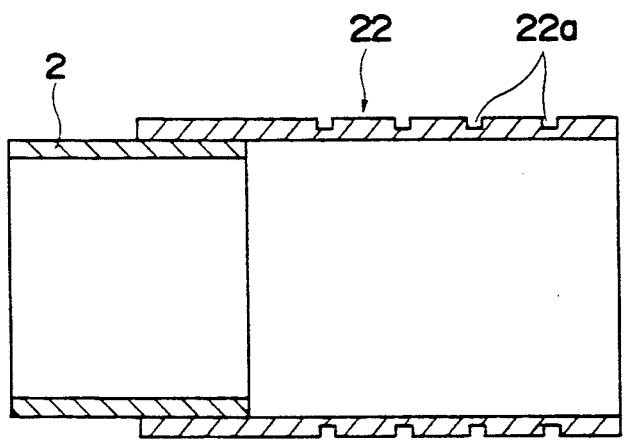
FIG. 17 is a modified example of FIG. 15 as an eighth embodiment.

The constitution is explained by referring to FIG. 17. In FIG. 17, instead of the bellows tube 21 in FIG. 15, plural annular recesses 22a are formed on the circumferential surface to convert into a flexible tube 22, and the same effects as shown in FIG. 15 are obtained.

Ninth Embodiment

Figure 18:
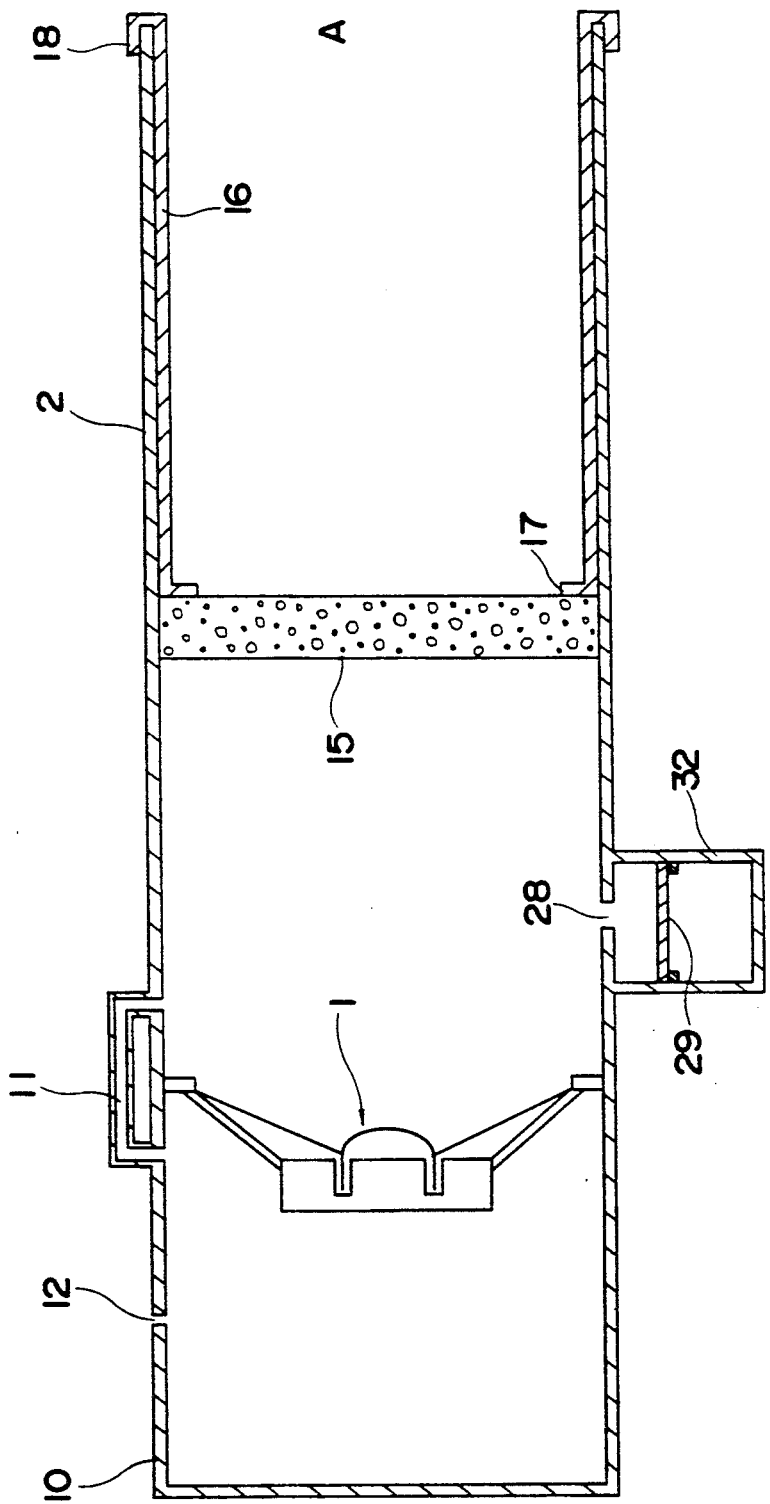
FIG. 18 is a modified example of FIG. 10 as a ninth embodiment.
Figure 19:
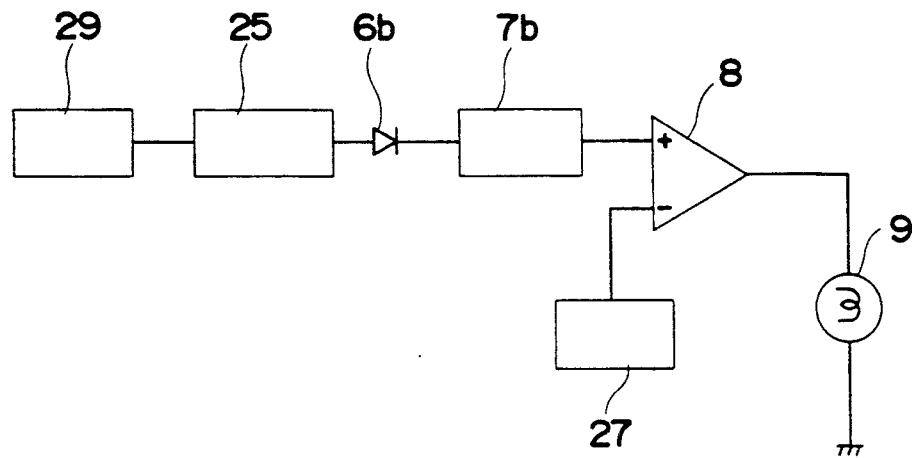
FIG. 19 is a explanatory drawing of a signal processing circuit from a microphone shown in FIG. 18.

The constitution is explained by referring to FIGS. 18 and 19. Firstly relating to the different points in FIGS. 18 and 10, in FIG. 18 a ceramic microphone 29 for detecting the magnitude of the sound emitted from the loudspeaker 1 and propagating through the tube 2 is added. The microphone 29 is arranged in a housing 32 disposed outside of the tube 2 between the loudspeaker 1 and the sponge 15, in a manner of dividing the space in the housing 32 into two. One space of the devided two communicates with the space in the tube 2 through a small-diameter hole 28, while the other space (the rear space of the microphone 29) communicates with the one space through a tiny air passing hole (not shown).

The electric circuit connected to the loudspeaker 1 and the microphone 29 used in the above-mentioned constitution is described by referring to FIG. 19. In FIG. 19, the same parts as in FIG. 5 are identified with the same reference numbers and are not explained herein. The loudspeaker 1 is driven in sine wave in the same circuit as the driving circuit 4 described in FIG. 5. The microphone 29 is connected to the band pass filter 25 for extracting only the frequency component same as the driving frequency of the driving circuit 4.

When thus composed, if the other open end A of the tube 2 is left open, the stationary wave is formed in the tube 2 and is resonating, so that the microphone 29 detects a loud sound. However, as the other open end A gradually becomes to be closed by the measuring object, the resonance state is gradually turned into a semiresonant state, and the sound detected by the microphone 29 gradually reduces to a specified lower level.

Tenth Embodiment

Figure 20:
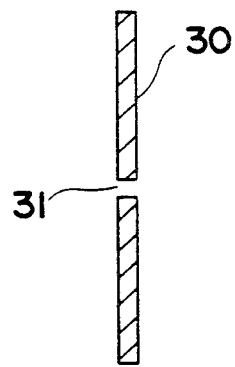
FIG. 20 is a tenth embodiment showing other embodiment relating to the sponge shown in FIG. 11.

The constitution is explained by referring to FIG. 20. The structure of FIG. 20 posesses a dust preventive function of the sponge 15 in FIG. 11, and a small-diameter hole 31 is formed in the center of a thin sheet 30. Since the thin sheet 30 is disposed at a node of the stationary wave formed in the tube 2, the sheet 30, even its hole 31 is small, does not cause any barrier because there is no air movement there.

What is claimed is:

1. A level detecting apparatus comprising:
an oscillator;
a tubular member with only one end open;
an acoustic stationary wave generating means for generating acoustic stationary waves of a specific frequency so as to have a node or antinode at the open end of the tubular member by receiving an oscillation output from the oscillator, the means being installed within the tubular member to divide it into an opening side and a closing side;
a communicating member provided to communicate between the opening side and the closing side of the tubular member divided by the acoustic stationary wave generating means; and
a switching circuit for providing a switching signal when said one open end of the tubular member is completely closed by a measuring object or the measuring object approaches said one open end to therby indicate that a predetermined level has been reached.

2. A level detecting apparatus according to claim 1, wherein the communicating member is composed of a fine tube.

3. A level detecting apparatus according to claim 2, wherein a fine pore communicating with outside is disposed in the closing side of the tubular member.

4. A level detecting apparatus according to claim 1, wherein a fine pore communicating with outside is disposed in the closing side of the tubular member.

5. A level detecting apparatus according to claim 1, wherein a partition wall having a hole in its center is disposed between the open end in the tubular member and the stationary wave generating means, and the hole in the partition wall is positioned at a node of the stationary wave.

6. A level detecting apparatus comprising:
an oscillator ;
a tubular member with only one open end;
an acoustic stationary wave generating means for generating acoustic stationary waves of a specific frequency so as to have a node or antinode at the open end of the tubular member by receiving an oscillation output from the oscillator, the means being installed within the tubular member to divide it into an opening side and a closing side;

a fine pore communicating with an outside disposed in the closing side of the tubular member; and a switching circuit for providing a switching signal when said one open end of the tubular member is completely closed by a measuring object or the measuring object approaches said one open end to therby indicate that a predetermined level has been reached.

7. A level detecting apparatus comprising:

an oscillator;

a tubular member with only one end open;

an acoustic stationary wave generator means for generating acoustic stationary waves of a specific frequency so as to have a node or antinode at the open end of the tubular member by receiving an oscillation output from the oscillator, the means being installed within the tubular member to divide it into an opening side and a closing side; and a sponge disposed so as to close a passage of acoustic stationary waves from the acoustic stationary wave generating means between the open end in the tubular member and the acoustic stationary wave generator means, the sponge in the tubular member being positioned at a node of the acoustic stationary wave; and a swtiching circuit for providing a switching signal when said one open end of the tubular member is completely closed by a measuring object or the measuring object approaches said open end to thereby indicate that a predetermined level has been reached.

8. A level detecting apparatus according to claim 7, wherein a tube is inserted into the opening side of the tubular member in a manner free to move back and forth, and the sponge is disposed at an insertion end of the tube.

9. A level detecting apparatus comprising:

an oscillator;

a tubular member with only one end open;

an acoustic stationary wave generator means for generating acoustic stationary waves of a specific frequency so as to have a node or antinode at the open end of the tubular member by receiving an oscillation output from the oscillator, the means being installed within the tubular member to divide it into an opening side and a closing side;

another tubular member provided on the open end portion of the tubular member and an open end of the another tubular member is formed into a bellows and made of a flexible material; and a switching circuit for providing a switching signal when said one open end of the tubular member is completely closed by a measuring object or the measuring object approaches said one open end to thereby indicate that a predetermined level has been reached.

10. A level detecting method utilizing a tubular member having at least one open end and an acoustic stationary wave generating means inside thereof dividing said tubular member into an opening side and a closing side, wherein:

a acoustic stationary wave having a node or antinode at the open end is generated by said acoustic stationary wave generating means, an acoustic impedance variation of an inside of said tubular member is detected as an electric impedance variation of said acoustic stationary wave generating means when said open end is completely closed by a measuring object or when the measuring object approaches said open end, and a switching signal is generated according to said electric impedance variation which indicates the detected level of the measuring object.

11. A level detecting method according to claim 10 wherein:

said specific frequency is a resonance frequency of said acoustic stationary wave generating means.

12. A level detecting apparatus comprising:

a tubular member having only one open end, a acoustic stationay wave generating means provided inside said tubular member dividing said tubular member into an opening side and a closing side, said acoustic stationary wave generating means generating acoustic stationary waves of a specifice frequency so as to stand a node or antinode of acoustic stationary wave at said open end of the tubular member, an oscillator for driving said acoustic stationary wave generating means, and a switching circuit, said switching circuit detecting an acoustic impedance variation of an inside of said tubular member as an electric impedance variation of said acoustic stationary wave generating means when said open end is completely closed by a measuring object or when the measuring object approaches said open end, said switching circuit furhter generating a switching signal according to said electric impedance variation.

13. A level detecting apparatus according to claim 12. wherein:

said specific frequency is a resonance frequency of said acoustic stationary wave generating means.

* * * * *